United States Patent [19]

Mellinger

[11] 4,352,267
[45] Oct. 5, 1982

[54] CHEMICAL DISPENSER FOR A ROUND BALER

[75] Inventor: Paul B. Mellinger, Willow Street, Pa.

[73] Assignee: Mellinger Manufacturing Co., Inc., Willow Street, Pa.

[21] Appl. No.: 221,842

[22] Filed: Dec. 31, 1980

[51] Int. Cl.³ ............................................. A01D 39/00
[52] U.S. Cl. ........................................ 56/341; 100/88; 406/12; 406/123
[58] Field of Search ..................... 56/341–343; 100/88; 222/238, 412; 406/135, 56, 61, 12, 29, 123

[56] References Cited

U.S. PATENT DOCUMENTS

| 691,948 | 1/1902 | Lee | 406/135 |
|---|---|---|---|
| 1,589,630 | 6/1926 | Cooper | 406/135 |
| 2,642,793 | 6/1953 | Heisey | 99/235 |
| 4,205,514 | 6/1980 | Wolrab | 56/341 |

FOREIGN PATENT DOCUMENTS 2033295  5/1980  United Kingdom ............... 56/341

OTHER PUBLICATIONS

Viewpoint, p. 3, dated Apr. 1980.

Primary Examiner—Jay N. Eskovitz
Attorney, Agent, or Firm—Michael R. Swartz

[57] ABSTRACT

A chemical dispenser that attaches to a round baler is provided for dispersing dry particulate chemicals, via an airstream, onto a mat of crop material as same is being delivered and formed into a large round bale in the bale forming chamber of the baler. The dry particulate chemicals are discharged in the form of a plume into a captive area defined by the inner and outer surfaces of the crop material mat so as to achieve substantially uniform distribution of the chemicals throughout the bale of crop material while conserving the usage of the chemicals. The chemical dispenser also incorporates automatic controls for discharging chemicals only in response to the delivery of the mat of crop material to the bale forming chamber thereby insuring substantially uniform distribution of the chemicals within the bale while preventing wasteful use of the chemicals.

9 Claims, 5 Drawing Figures

CHEMICAL DISPENSER FOR A ROUND BALER

CROSS REFERENCE TO RELATED APPLICATION

Reference is hereby made to the following copending U.S. application dealing with related subject matter and having the same inventor and filed on the same date as the subject application: "Chemical Dispenser With Crop Flow Responsive Switch Means" by Paul B. Mellinger.

BACKGROUND OF THE INVENTION

The present invention relates to chemical dispensers, and, more particularly, is directed to an improved chemical dispenser adapted to be used in conjunction with a large round baler for applying dry particulate chemical to the crop material as same is being formed into a large round bale.

Although large round balers are relatively new, they have achieved much success in the market place and are widely used by farmers and livestock operators. These machines are used to bale a variety of forage crops, such as hay and the like, and generally form a bale 5–6 feet long, 4–5 feet in diameter and weighing approximately 1000–1500 pounds. Due to the size and weight of these large round bales, transport and storage thereof is not as convenient as the conventional smaller rectangular bales. Consequently, it has been a common practice to store these bales outside, generally in the field where they were formed.

One problem with outside storage of these large round bales is weathering. Exposure to excessive rain, snow, ice and other elements causes spoilage of the crop. In such outside storage, a given amount of waste is expected and normally accepted. However, while this spoilage waste is costly to the farmer or livestock operator on a crop loss basis alone, it could increase his risk of herd losses should he feed this spoiled crop material to his livestock.

Another problem associated with the large round bale is when the forage crop is too wet when formed into a bale. Such bales containing excess moisture, when exposed to air, are subjected to the growth of mold, fungi, mildew and the like. Animals are reluctant to eat such types of spoiled crop material, but if they do, they can suffer adverse health effects therefrom. In addition high moisture crop material, such as hay, formed into a bale is commonly known to ignite by spontaneous combustion causing destruction not only of the crop material bale, but also the building in which the bale may be stored. Thus, there is a strong desire to prevent this type of spoilage in addition to the spoilage caused by weathering.

Yet another problem associated with the large round bale is the nutritional value of the crop material. Some crop materials do not have a high nutritional feed value; other crop material, such as hay, if cut and then rained on before being formed into a bale loses part of its nutritional value. Round balers have little success in trapping the leaves of very dry hay. It is the leaves which are high in nutritional value. As a result, the adding of nutrients to such crop materials is recognized and desired.

Attempts have been made to solve some, if not all, of these problems associated with the large round forage crop material bale. However, each of the attempted solutions has its disadvantages and shortcomings, and no single solution until this present invention satisfactorily and successfully overcomes the above stated problems.

One approach to solve the spoilage problem of large round bales due to weathering when stored outside is to wrap the bale with a plastic material or encase the bale in a plastic bag. Besides the extra costs, time, and work expended in such an encasing process, this approach does not address the problem of spoilage due to the baling of wet hay nor does it address the problem of adding nutrients to the forage crop material.

Another approach to the spoilage problem due to weathering has been taken by some of the round bale manufacturers. Attempts have been made to design a round bale machine that wraps the crop material in such a way that the outer layers of the bale act as a cover or shield to prevent rain and the like from penetrating into the bale. This approach has not been as successful as desired, and furthermore, again does not address the problems of spoilage due to wet crop material or the adding of nutrients to the bale.

The adding of nutritional chemicals to the hay during the baling process was recognized many years ago as evidenced by Heisey in U.S. Pat. No. 2,642,793 which shows an attachment for square/rectangular bales wherein dry particulate nutritional chemicals were sprinkled into the bale forming chamber for distribution of chemicals within the square bale. The chemical dispenser was mechanically driven by a star wheel in contact with and advanced by the bale being pushed through the bale chamber.

More recently, others have borrowed from the teachings of the Heisey patent and taken a conventional chemical dispenser, now driven by an electric motor, and have attached it to a large round baler for adding not only nutritional chemicals to the crop material being baled, but also, preservative type chemicals so as to prevent crop material spoilage caused from weathering and/or the baling of wet crop material. This round baler chemical attachment, operating similar to the one used by Heisey, drops or sprinkles the chemicals over the crop material as it is being formed into a bale. One disadvantage with such an attachment is that the chemicals are not uniformly distributed throughout the bale. Another disadvantage is that there is much waste of the chemicals which is costly. Further, since the dispenser is manually operated it requires much time and concentration by the operator.

Relatively recently, as shown in U.S. Pat. No. 4,205,514, there has been introduced into the market place a chemical dispenser attachment for a round baler which sprays liquid chemicals (preservatives or nutrients) into a bale. The attachment includes a pump that is driven by the power takeoff of a tractor which tows the round baler, a liquid holding tank for storing the chemicals to be sprayed, and a plurality of spray nozzles for spraying the chemicals on the crop material. For automatically turning the spray nozzle on and off, the attachment also includes an on-off valve which is actuated through a mechanical linkage by the bale being formed when it reaches a given size. Although this attachment may be an improvement over the art, it is not the most desired for the reason that it applies the chemicals in a liquid form rather than a dry particulate form in which chemicals are more readily available, easier to store, and more convenient to work with. Furthermore, such an attachment contains several components which are not only costly, but must be cleaned often, preferably after each use. Still further, the operator must exercise care in not allowing the liquid chemical to be sprayed on the components of the baler where such may cause failure and malfunction of same.

Thus, it is desirable to have a chemical dispenser for attachment to a round baler which would apply dry particulate chemicals, rather than liquid chemicals, to the crop material as it is formed into a large round bale and which attachment would be capable of dispersing the chemicals on the crop material rather than just sprinkling the chemicals on the crop material so as to achieve substantially uniform distribution of the chemicals throughout the crop material bale. Further, in keeping with the above, it is desirable that the chemicals will be applied only to the crop material rather than other components of the round baler, thereby conserving the usage of chemicals which are expensive, and also decreasing the likelihood of malfunction of the baler. Still further, it is desirable that the chemical dispenser be operated automatically rather than manually so as to insure that each bale or portion of the bale has complete distribution of chemicals throughout and so that chemicals are not wasted during times when a bale is not being formed such as when the operator is traveling to and from the fields, and when there is an incomplete windrow.

SUMMARY OF THE INVENTION

Accordingly, it is one of the principal objects of the present invention to provide an improved dry particulate chemical dispenser for a round baler which overcomes the aforementioned problems associated with the prior art chemical dispensers.

Another object of the present invention is to provide a chemical dispenser for a round baler for dispersing dry particulate chemicals onto the crop material as same is being formed into a large round bale whereby the chemicals are uniformly distributed throughout the bale.

A further object of the present invention is to provide a chemical dispenser for a round baler which disperses dry particulate chemicals on both the inner and outer surfaces of the crop material mat so as to insure complete and uniform distribution of the chemicals throughout the crop material bale.

A still further object is to provide a chemical dispenser for a round bale for dispersing dry particulate chemicals only on the crop materials per se rather than on the ground and the round baler itself, thereby conserving the usage of chemicals.

Yet another object of the present invention is to provide a chemical dispenser for a round baler which is automatically controlled so as to insure that dry particulate chemicals will be applied to the crop material only during delivery of crop material to the baler when a bale is being formed in the baler.

Another object of the present invention is to provide a dry particulate chemical dispenser which is simple and reliable in structure, easy to attach to a round baler, and economical to manufacture.

In furtherance of these and other objects, the present invention sets forth an improved chemical dispenser for attachment to a large round baler wherein dry particulate chemicals are dispersed onto the crop material as it is being formed into a bale so as to achieve substantially uniform distribution of the dry particulate chemicals throughout the crop material bale. More particularly, the chemical dispenser includes a distributor unit having a hopper for temporary storage of chemicals with a dispensing mechanism that operates to positively dispense selective quantities of the chemicals into a positive airstream that is generated by a blower. The positive airstream is defined and understood herein to mean a generally straight flow path along which air can be forced to move by the blower, in generally uninterrupted and unobstructed fashion, from the blower to the region of chemical discharge toward the bale. The dispersed dry particulate chemicals are directed toward the crop material and are discharged in a plume like form into a wedge-shaped area being defined between the inner surface of the crop material entering the bale forming chamber of the baler and the outer surface of the crop material within the bale chamber which has been formed into a roll.

In discharging this plume of dry particulate chemicals into this wedge-shaped area, chemicals are dispersed onto both the inner and outer surfaces of the crop material mat as it is wrapped into a roll, thereby resulting in substantially uniform distribution of the dry particulate chemicals throughout the crop material bale. In addition thereto, such plume-like discharge of the dry particulate chemicals into this wedge-shaped area captivates and forces the discharge of chemicals only onto the crop material rather than on the ground and on the components of the round baler, and thus, tends to eliminate unwanted, unnecessary and wasteful discharge of the chemicals, thereby conserving the usage of chemicals which are costly.

The present invention further includes, in the preferred embodiment, a switch for automatically controlling the discharge of the chemicals onto the crop materials in response to the delivery and non-delivery of crop materials to the bale forming chamber so as not only to insure that chemicals have been dispersed throughout the crop material bale, but also, to eliminate wasteful usage of the dry particulate chemicals. The switch is connected to the distributor unit for controlling its operation of dispensing the chemicals, and preferably, includes a sensor element that extends into the flow path of crop material about the pick-up means of the baler. Preferably, the sensor element is biased to an off position so that chemicals are not discharged when no crop material passes over the pick-up means. However, when crop material passes over the pick-up means the sensor element is deflected by contact with the crop material to an on position which actuates the distributor unit so as to dispense chemicals into the airstream wherein the dispersed chemicals are then discharged into the crop material.

These and other advantages and attainments of the present invention will become apparent to those skilled in the art upon reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

FIG. 3 is an enlarged sectional view as taken along line 3—3 of FIG. 1 of the distributor unit being removed from the baler and being disconnected from the dispensing means.

FIG. 4 is an enlarged sectional view of the distributor unit, looking in from the right side thereof, as view in FIG. 1 with the distributor unit being removed from the baler and from the dispensing means.

FIG. 5 is an enlarged top plan view of the dispensing means being removed from the baler and from the distributor unit.

DETAILED DESCRIPTION OF THE INVENTION

In the following description, right hand and left hand references are determined by standing at the rear of the machine and facing in the direction of forward travel. Also, in the following description, it is to be understood that such terms as "forward", "left", "upwardly", etc., are words of convenience and are not to be construed as limiting terms.

IN GENERAL

Referring now to the drawings, and particularly to FIG. 1, there is shown a crop material roll forming machine, commonly referred to as a round baler and generally indicated by the number 10, being provided with a base frame, generally designated 12, having right and left sides (the left side being omitted for clarity) between which extends a roll (bale) forming region or chamber, being generally designated by the number 14 and within which a partially completed bale R is illustrated. The frame 12 is supported and made mobile by right and left ground engaging wheels 16 (only the right wheel shown) rotatably mounted on respective spindles 18, and being connected to and extending outwardly from respective opposite sides of the machine 10.

The machine 10 is adapted to be connected to a tractor (not shown) for towing the machine forwardly across a field in field operation or road transport by means of a tongue 20 which is connected at its rear end to and extends forwardly from a horizontal beam 22 of frame 12. Horizontal beam 22 extends transversely between and interconnects with the opposite sides of frame 12.

Extending forwardly from the lower front portion of the mobile frame 12 of the machine 10 is a pick-up 24 having tines 23 which are adapted to be rotated in a counter-clockwise direction as viewed in FIG. 1 so as to gather the crop material from the field and deliver it rearwardly, in the form of a mat, to the bale forming chamber 14. Extending over the pick-up 24 and supported by elements of frame 12 is a conventional wind guard 25 which serves to compress and mat the material as it passes over the pick-up. The crop material is delivered rearwardly by the pick-up 24 to the front end of a lower apron, generally indicated by the numeral 26.

The lower apron 26 is formed by a series of endless flexible lug-bearing chains 28 which are transversely spaced apart even distances and which extend around front drive sprockets 30 mounted on front shaft 32 rotatably supported between the sides of the frame 12 at the front thereof. The chains 28 also pass around rear idler sprockets 34 mounted on shaft 36 rotatably supported between the sides of frame 12 at the rear thereof.

Mounted upon fore-and-aft spaced transverse members 38 of the base frame 12 is a floor 40. The floor 40 is rigid and generally horizontally disposed. The upper course of the lower apron chains 28 move in a rearward direction across the floor 40 to convey the crop material received from the pick-up toward the rear of the machine 10.

The lower course of an upper apron assembly, being generally designated by the numeral 42, engages and directs the material reaching the rear end of the frame 12 into an upward and forward direction to effect, in combination with the lower apron 26 at the roll forming chamber 14 of the machine 10, a rolling of the crop material into a roll R in the direction of the arrow A of FIG. 1. During roll forming, as the lower and upper courses of the upper apron 42 move respectively in the direction of arrows A and B in FIG. 1, it will be understood that the lower course of the upper apron 42 is capable of expanding as the roll R expands in diameter. This is allowed by idler sprockets 44 and 46, which movably support portions of the upper course of apron 42, being mounted upon arms 48, 50 disposed adjacent each side of the frame 12 and supported on a transverse shaft 52 rotatably mounted between the sides of the frame 12 at the upper portions thereof. The arms 48, 50 are biased by extension springs (not shown) mounted along the frame sides which normally position the upper apron in a contracted condition wherein the lower course thereof is adjacent the lower apron 26, but are yieldable for allowing the aforementioned expansion of the lower course during roll formation.

The upper apron 42 also extends about front drive sprockets 54 mounted on a shaft 56 rotatably supported between the sides of the frame 12 at the front portion thereof.

The base frame 12 also includes a rear upper frame or tailgate assembly 58 which is pivotally connected at 60 to the upper portions of the sides of the frame and extends transversely therebetween. The tailgate assembly 58 is pivotally moved clockwise from its lower roll forming position, as shown in FIG. 1, to an upper discharge position (not shown) by a pair of hydraulic cylinders 62 (only the right one being shown) respectively mounted on and extending along the sides of the frame 12. The tailgate 58 rotatably mounts upper and lower idler sprockets 64, 66 and 68 respectively about which the upper apron 42 also extends.

For providing rotary power to the pick-up 24 and the lower and upper aprons 26, 42 an input driveline (not shown) is provided along the tongue 20, being adapted for connection at its forward end to the power takeoff (PTO) shaft of the tractor for rotation in unison therewith to supply rotary driving power to various of the operative components of the machine through power transmitting components (not shown). The hydraulic cylinders may be suitably connected to hydraulic sources on the tractor.

IMPROVED CHEMICAL DISPENSER

In order to prevent spoilage of crop material due to weathering of the round bale being stored outside or due to baling of too wet crop material and/or to add additives to the crop material, such as nutrients, the round baler 10 is provided with an improved chemical dispenser, generally designated by the numeral 70, for dispensing dry particulate chemicals, either of the nutritional type or of the preservative type, to the crop materials as same is being formed into a large round bale so as to obtain substantially uniform distribution of the chemicals throughout the crop material bale while conserving the usage of the chemicals and preventing waste thereof which is costly.

Figure 1:
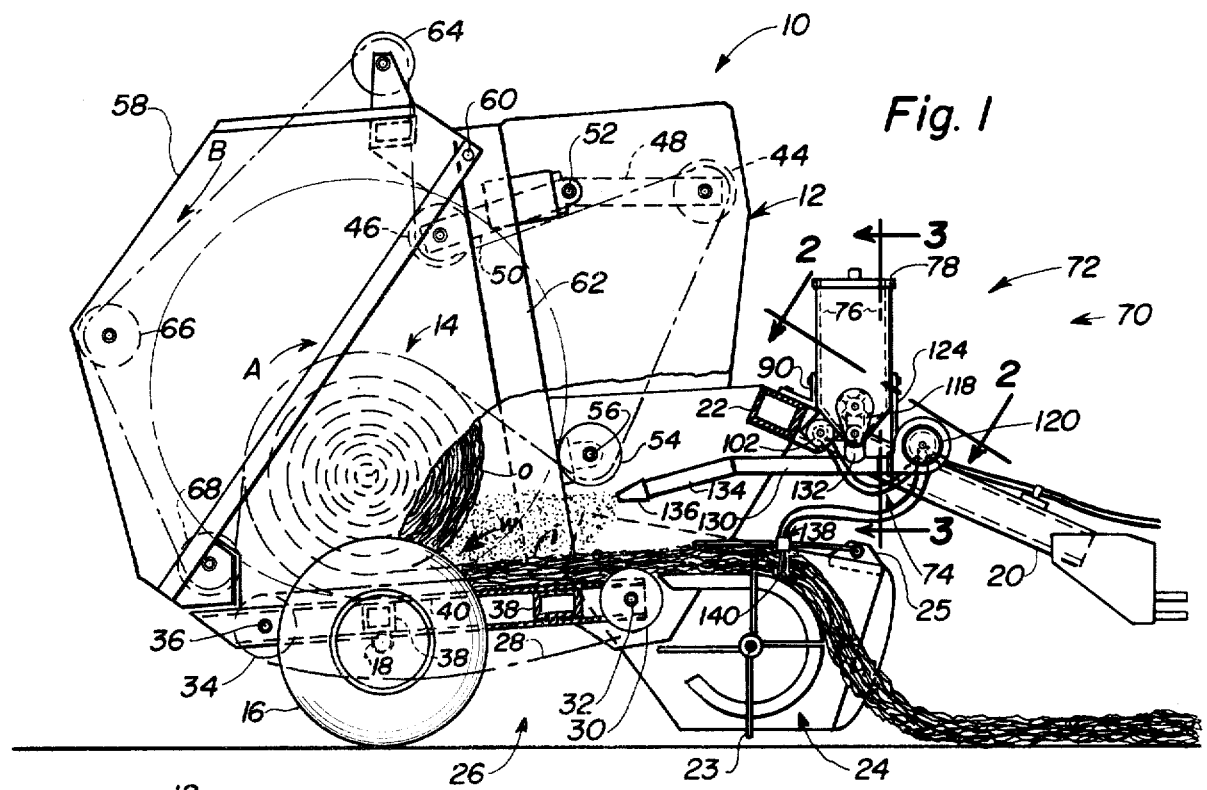
FIG. 1 is fragmentary side elevational view of a conventional round baler on which the chemical dispenser of the present invention is attached with crop material being gathered from the field by the pick-up and delivered to the bale forming chamber wherein a bale is being formed and with the crop material in passing over the pick-up deflecting the sensor element to its on position whereby dry particulate chemicals are dispersed into the wedge-shaped area.

Still referring to FIG. 1, the chemical dispenser 70, basically includes a distributor unit, generally designated by the numeral 72, and dispensing means, generally designated by the numeral 74; the distributor unit 72 dispenses selected amounts of the dry particulate chemicals to the dispensing means 74, which in turn, dispenses the dry particulate chemicals onto the crop material.

Figure 3:
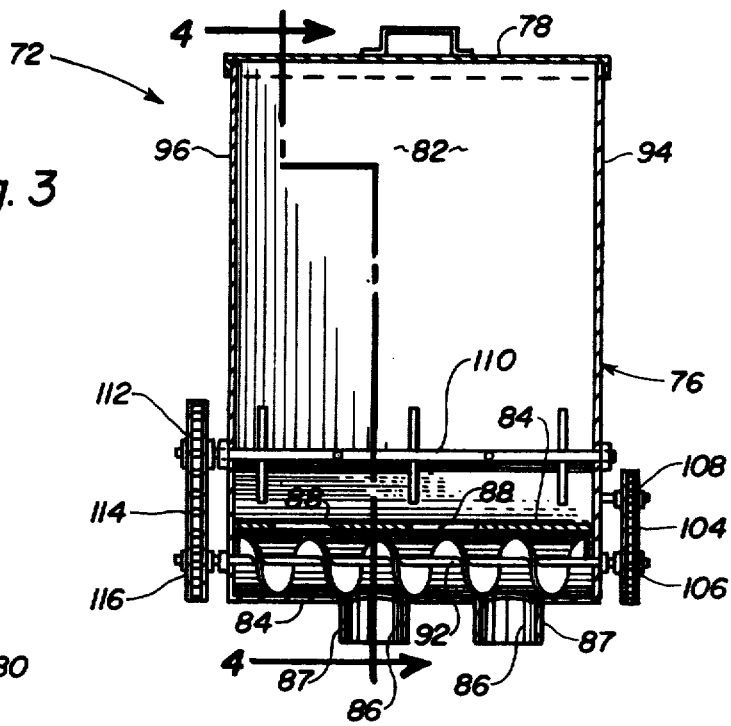
Figure 4:
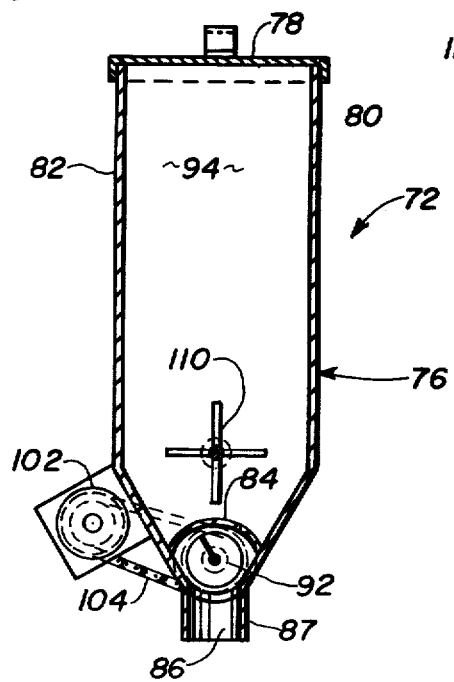

The distributor unit 72 includes a rectangular-shaped hopper 76, preferably made of sheet metal, for temporary storage of dry particulate chemicals therein. A removable lid 78 is provided for the top of the hopper 76 whereas the lower portions of the front and rear walls 80, 82 respectively of the hopper 76 slope inwardly toward one another so as to funnel the chemicals downwardly toward the bottom thereof. Disposed within the bottom and suitably secured by the sidewalls of hopper 76 is a transversely extending shroud tube 84 (best seen in FIGS. 2, 3 and 4) having a pair of circular-shaped, transversely spaced, discharge openings 86 provided in the lower surface thereof and a pair of square-shaped, transversely spaced, inlet openings 88 provided in the upper surface of the tube 84 (see FIGS. 2 and 3). The discharge and inlet openings 86, 88 of shroud tube 84 are laterally offset from one another, the purpose thereof being further discussed later on. As seen in FIGS. 3 and 4, each of the discharge openings 86 is provided with a short nipple extension 87 extending downwardly therefrom. The hopper 76 is attached to the horizontal beam 22 of frame 12 of machine 10 by a bracket 90 and suitable attaching bolts (see FIGS. 1 and 2).

For dispensing or metering chemicals out the discharge openings 86 of the hopper 76, the distributor unit 72 includes a dispensing mechanism in the form of a transversely extending auger 92 dispensed within the shroud tube 84 and which is adapted to be rotated therewithin. The auger 92 is rotatably supported at each end thereof by suitable bearings secured on the respective end of tube 84. The left end of the shaft of auger 92 projects outwardly a short distance past the left sidewall 94 of hopper 76, whereas, the right end of the shaft of auger 92 projects outwardly a short distance past the right sidewall 96 of hopper 76. The auger 92 is rotated by an electric motor 102, suitably supported slightly below and to the undersurface of the rear wall 82 of hopper 76, through a drive connection to the auger 92 by a chain 104 entrained about a sprocket 106 suitably fastened to the left outward end of the auger shaft and a drive sprocket 108 suitably fastened to the output shaft of the motor 102 (see FIG. 2). As can be readily appreciated, when the auger 92 is not rotated, no chemicals are dispensed out through the discharge openings 86 nor can any chemicals freely drop through the discharge openings 86 due to the lateral offset between the inlet openings 88 and discharge openings 86. However, when the auger 92 is rotated by the motor 102 through its associated drive, the chemicals enter onto the auger 92 through the inlet openings 88 and then are conveyed by the flighting of the auger 92 laterally through the shroud tube 84 to the discharge openings 86. In regulating the amount of chemicals to be dispensed, a conventional grate plate (not shown) is provided which lies over the shroud tube 84 and is slideable therealong so as to restrict the size of the inlet openings 88, thereby adjusting the amount of flow of chemicals that pass through the inlet openings 88 and onto the auger 92.

Figure 2:
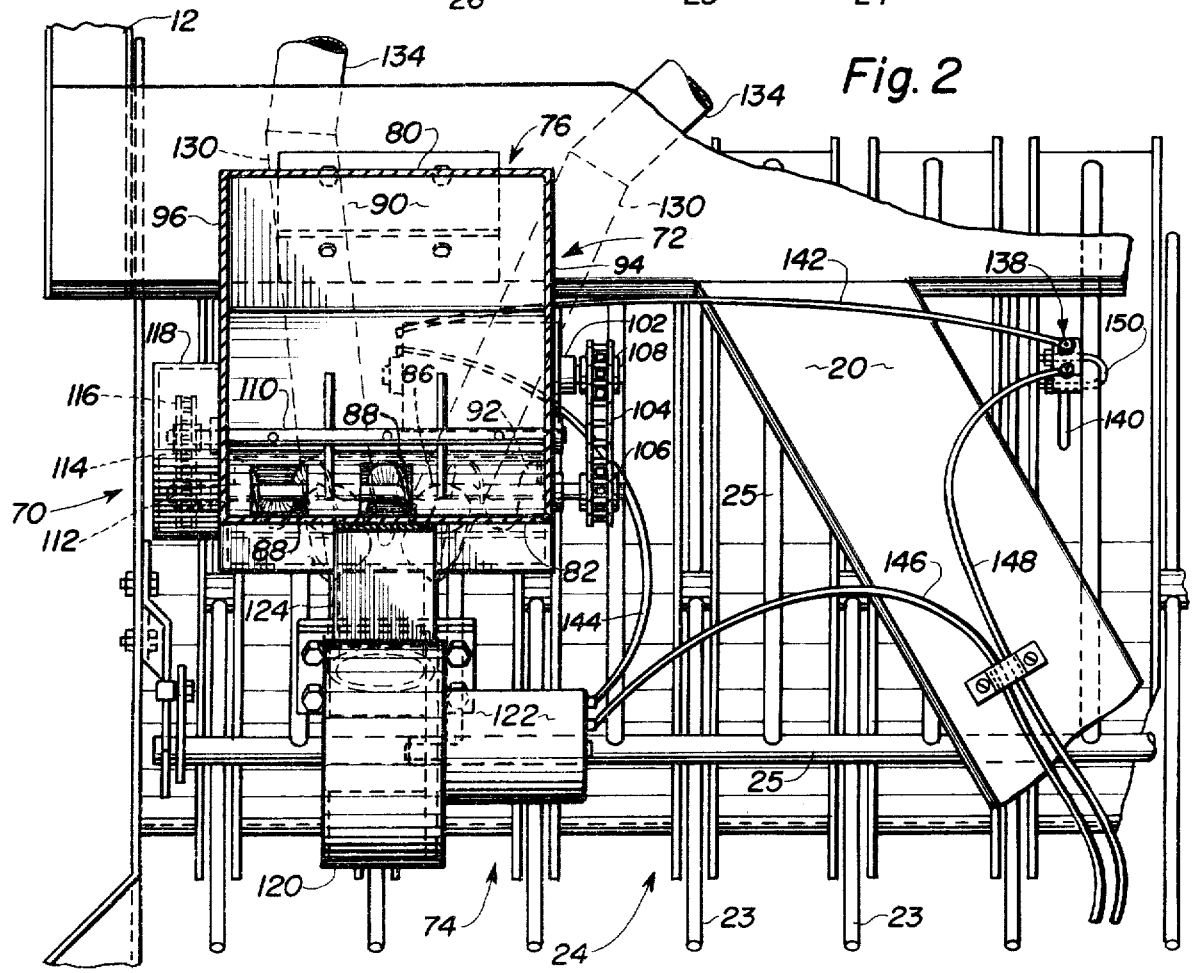
FIG. 2 is an enlarged fragmentary plan view as taken along line 2—2 of FIG. 1 showing the front portion of the round baler with the hopper of the distributor unit being shown in section and with the drive for the agitator and the dispensing mechanism being seen in full. The sensor element is seen in its off position wherein no crop material is being passed over the pick-up and no chemicals are being discharged.

In still referring to FIG. 2, the distributor unit 72 further includes a rotatably driven agitator 110 which not only keeps the dry particulate chemicals loose and prevents same from clumping, but also assists the operation of the auger 92 in forcing the chemicals down through the inlet openings 88 and onto the auger 92 so as to promote the positive dispensing of the chemicals out and through the discharge openings 86. The agitator 110 is disposed a short distance above the auger 92, extending transversely between and being rotatably supported by the side walls 94, 96 of the hopper 76 within suitable bearings. The right end of the agitator 110 extends through and past the right sidewall 96 and supports a sprocket 112 that is driveably connected by a chain 114 that extends around a sprocket 116 supported on the right end of the shaft of the auger 92. The drive is such that rotation of the auger 92 by the motor 102, causes the agitator 110 to rotate therewith. As seen in both FIGS. 1 and 2, a guard cover 118 is provided on the right side of the hopper 76 to shield an operator from sprockets 112, 116 and chain 114.

Before going further, it should be pointed out that, in addition to the adjustable grate plate referred to above, the amount of chemicals to be dispensed out through the discharge openings 86 can also be regulated by the rotational speed of the auger 92 which is governed by the output of the motor 102 and the diameters of the left sprockets 106 and 108. Thus, by changing the size of sprockets 106 and 108, the rotational speed of the auger 92 can be either increased, wherein a larger amount of chemicals will be dispensed, or, be decreased, wherein a lesser amount of chemicals will be dispensed. Likewise, the rotational speed of the agitator 110 is governed by the size of the right sprockets 112 and 116, thus the rotational speed of the agitator 110 can either be increased or decreased by using smaller or larger diameter sprockets.

Figure 5:
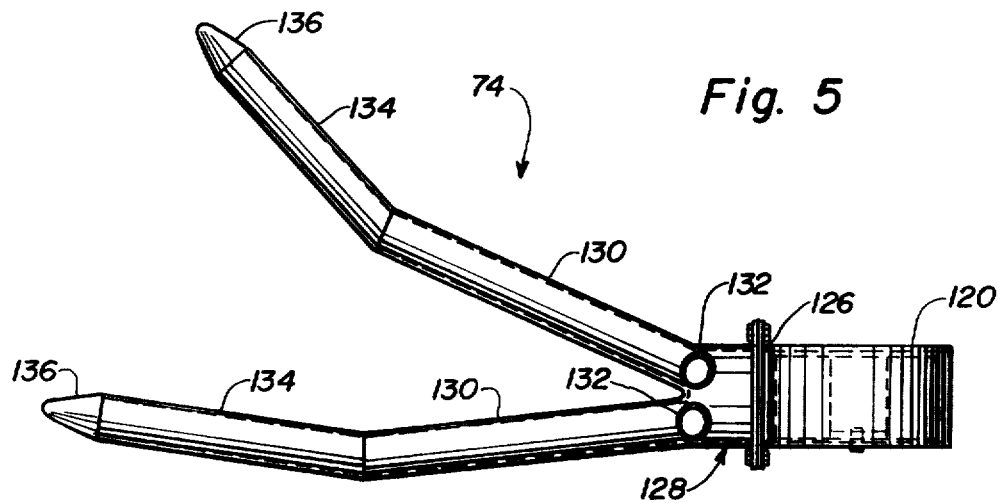

The dispersing means 74 is disposed so as to receive the dispensed chemicals from the distributor unit 72 and disperse the same onto the crop materials as they are formed into a large round bale within the bale forming chamber 14 so as to achieve substantially uniform distribution of the dry particulate chemicals throughout the crop material bale (see FIG. 1) More particularly, the dispersing means 74 includes a blower 120 that is operated by an electric motor 122 to produce a positive airstream and which is attached to the front wall 80 of hopper 76 by a bracket 124. The blower 120 is positioned such that its discharge spout 126 faces rearwardly for suitable connection with a Y-shaped manifold 128 (see FIG. 5) having two rearwardly projecting direction tubes 130 (only the right direction tube being seen in FIG. 1) which are disposed slightly below the discharge openings 86 of the hopper 76. Each of the direction tubes 130 have an aperture in the top wall with a short intake sleeve or port 132 (only the right sleeve being shown in FIG. 1) projecting upwardly therefrom and having an inside diameter slightly larger than the outside diameter of the nipple extensions 87 that project down from the discharge openings 86 and which seat within the corresponding intake sleeves 132. To channel the airstream, with its dispersed dry particulate chemicals, rearwardly toward the bale forming chamber 14, the direction tubes 130 are provided with direction tube extensions 134. In the preferred embodiment, one extension 134 is suitably connected to each one of the direction tubes 130. The necessity of using direction tube extensions, as well as the exact length of the extensions, is dependent upon the distance from the attachment location of the dispersing means 74 to the bale forming chamber 14, and this distance varies with the many different types and models of round balers on the market. Additionally, in the preferred embodiment, each of the direction tube extensions 134 is provided with a nozzle or deflector 136 (see FIGS. 1 and 5) adjustably mounted on the distal end of the extension 134 whereby the deflectors 136 can be rotated about the longitudinal axis of the extensions 134 so as to direct the discharge of the airstream with its associated chemicals onto and/or toward desired locations transversely along the bale forming chamber 14. Such deflector adjustment permits concentration of the dispersed chemicals toward one transverse area, or, in the preferred alternative, allows for dispersion of the chemicals along the complete transverse width of the bale forming chamber 14, which transverse width varies depending upon the model of round baler. It should also be noted here that in the preferred embodiment, the dispersing means 74 includes two separate, transversely space, direction tubes 130 with their corresponding extensions 134 which extend rearwardly from the Y-shaped manifold 128 (FIG. 5); however, the present invention is equally applicable to only one such direction tube, as well as a multiplicity of direction tubes. Furthermore, it should be noted, that the direction tubes 130 and their extensions 134 are rigid and relatively straight in thereby providing for a smooth, uninterrupted flow path for the airstream and the dispersion chemicals.

The flow path of the dry particulate chemicals is as follows: the chemicals are dispensed from the distributor unit 72 down through the discharge openings 86 and enter through inlet ports 132 into the manifold 128 and contact the positive airstream which is generated by the blower 120, the positive airstream disperses the dry particulate chemicals and forces same rearwardly through the direction tubes 130, extensions 134, and deflectors 136 wherein the dispersed chemicals are discharged, in the form of a plume, toward and into the crop material being formed into a bale. The plume-like dispersion of chemicals onto the crop material has been found to enhance the chemical-crop material contact, coverage and penetration, thereby resulting in a more uniform distribution of the chemicals throughout the crop material.

To further enhance the uniform distribution of the dry particulate chemicals throughout the crop material baler, as well as to conserve the usage of chemicals and prevent waste thereof which is costly, in the preferred embodiment, as best seen in FIG. 1, the plume of dispersed chemicals are discharged into the wedge-shaped area, generally designated by the letter "w", which is defined between the outer surface "o" of the crop material mat being formed into a bale within the bale forming chamber 14 and the inner surface "i" of the crop material mat being delivered to the bale forming chamber 14 by the pick-up 24. In discharging the plume of dispersed chemicals into this wedge-shaped area "w", not only are both the inner "i" and outer "O" surfaces of the crop material mat subjected to chemical contact thereby resulting in more complete and uniform chemical distribution, but in addition thereto, the chemical discharge is captivated and restricted to this wedge-shaped area "w", thus the chemicals are only being discharged onto the crop material and are not discharged onto either the frame 12 of the baler 10 or onto the field which is wasteful and costly.

Referring again to FIGS. 1 and 2, the chemical dispenser 70 further includes switch means for automatically controlling the operation of the dispenser 70 in response to the delivery and non-delivery of crop material to the bale forming chamber 14 so that the chemicals are only discharged onto the crop material when the crop material is being delivered to the bale forming chamber 14. In such manner, it is insured that chemicals will be discharged onto the crop material and that the completed crop material bale will have substantially uniform distribution of the chemicals throughout, while, at the same time, preventing unnecessary use and waste of the chemicals which is costly.

In the preferred embodiment, the switch means is in the form of an electrical switch 138 with a sensor element 140 and which electrically interconnects, in series, the electric motor 102 of the distributor unit 72 and the electric motor 122 of the dispersing means 74 to any suitable electric power source, such as, the power source on the tractor (not shown) which is used to tow and supply the other power to operate the components of the baler 10. The switch 138 is positioned adjacent the pick-up 24 and is adapted to sense the presence and non-presence (absence) of crop material on the pick-up 24. Electric wire 142 connects one terminal of the switch 138 to the electric motor 102, wire 144 connects the electric motor 102 to the electric motor 122, and wire 146 leads from the electric motor 122 to the tractor power source, whereas, wire 148 leads from the other terminal of the switch 138 to the tractor power source. As easily understood, if the switch 138 is closed the electric circuit is complete and the electric motors 102, 122 are energized by the power source, and likewise, if the switch is open the circuit is broken and no electrical current is passed to the electric motors 102, 122 from the power source.

More particularly, the switch 138 is of the single pole type, and preferably, is biased to its open inoperative position (as shown in dotted lines in FIG. 1). A switch of the instant type is Model K5B15-T manufactured by the UNIMAX SWITCH Company.

The switch 138 is positioned adjacent the pick-up 24 and is mounted by a U-clamp 150 to one of the integral elements of the windguard 25. Preferably, the switch 138 is mounted and disposed such that the senser element 140 of switch 138 extends into the flow path of crop material over the pick-up 24.

The operation of and the benefits gained from the automatic control of the chemical dispenser 70 are readily appreciated and easily understood. When the operator is transporting the baler 10 down the road or from his barnyard to the field of crop material he intends to bale, the sensor element 140 of the switch 138, being biased to its open-circuit inoperative position (as shown in dotted lines in FIG. 1), prevents the flow of electrical current from the tractor power source to the electric motors 102, 122 of the respective distributor unit 72 and dispensing means 74, thus resulting in the non-discharge of chemicals and preventing wasteful use of the chemicals. However, when the operator reaches the crop material field to be baled, activates the baler 10 which rotates the pick-up 24, and as the operator goes down the crop material windrow, crop material is picked up from the field, passes over the pick-up 24 and is delivered to the bale forming chamber 14. As the crop material passes up and over the pick-up 24, it (the crop material) physically engages the sensor element 140 of switch 138, forcing the same from its biased open inoperative position to its second closed operative position (as shown in full lines in FIG. 1), thereby completing the electrical circuit, energizing the electric motors 102, 122, causing the distributor unit 72 and the dispersing means 74 to operate, which thereby results in the discharge of chemicals onto the crop material in the wedge-shaped area "w". Should the operator stop the forward movement of the baler 10 down the field for some reason, such as, to discharge a completed bale, but continues to operate the baler 10 (the pick-up is rotating and the bale forming chamber is operating), the discharge of chemicals is stopped, as soon as the flow of crop material over the pick-up is stopped. The sensor element 140 springs back to its inoperative open position as soon as no more crop material passes over pick-up 24, thereby resulting in stopping the discharge of chemicals. This automatic control feature is extremely beneficial to the operator when he is confronted with an incomplete windrow of crop material, that is to say, where there is a windrow length of crop material and then a bare section, a windrow of crop material and then a bare section. In such circumstances, it can be seen that the automatic control described above would operate so as to only discharge chemicals when the baler 10 is negotiating the windrow length of crop materials, then the chemical discharge operation is stopped while the baler is moving over the bare section, and then the chemical discharge is again resumed when the baler negotiates the next windrow length of crop material.

Thus, it can be seen that the automatic control for the dispenser 70 operates such that chemicals are discharged only when crop materials are passing over the pick-up 24 and being delivered to the bale forming chamber 14 and that no chemicals are discharged when crop materials are not passing over the pick-up 24 and are not being delivered to the bale forming chamber 14, thereby preventing waste. Furthermore, it can be appreciated, that in addition to preventing waste, the automatic control of the chemical dispenser 70 insures that each and every bale, as well as each and every section that makes up the crop material bale, has been treated with chemicals so as to achieve complete and substantially uniform distribution and dispersion of the chemicals throughout the bale. Such a automatic chemical discharge/non-discharge feature tends to eliminate human error in such cases where the operator fails to remember to turn-on and turn-off a manually controlled dispenser at the precise times, thus providing more freedom to the operator in permitting him to devote more time and concentration to other concerns of the baling operation.

It should also be mentioned here that, while in the above described preferred embodiment, the switch 138 electrically interconnects, in series, the motor 102 of the distributor unit 72 and the motor 122 of the dispersing means 74 to the tractor power source, the switch 138 only would need to interconnect the motor 102 to the tractor power source so as to control the operation of the distributor unit 72 in dispensing and non-dispensing of chemicals to the dispersing means 74. In such situations, the dispersing means 74 would either be operated continuously or its operation would be controlled by a separate switch. Even though the dispersing means 74 may run continuously which may not be desirable, chemicals will not be discharged when the distributor unit 72 is not operating to dispense chemicals. Because the distributor unit 72 has a lateral offset between the top inlet openings 88 and the bottom discharge openings 86, chemicals can only be dispensed when the auger 92 is rotated, and, the possibility of chemicals falling freely (by gravity) down through the discharge openings 86 is nil. It should be pointed out that other types of distributor units, having a different construction than the one described above do allow the free gravity falling of chemicals out through the discharge openings even though the operation of the distributor unit is stopped, such condition being enhanced by the jarring action caused by a baler moving over a rough and bumpy field. The use of a distributor unit that does not prevent the free falling of chemicals therefrom when in its operative mode, would result in a waste of chemicals, an uneven and non-uniform distribution of the chemicals throughout the crop material bale, and could cause a malfunction to the other components of the chemical dispenser. Such unwanted results would occur whether or not the operation of the dispersing means is controlled simultaneously with the operation of the distributor unit or whether the dispersing means is operated continuously. For example, when the distributor unit is in its operative mode but chemicals freely fall therefrom into the dispersing means which is operating continuously, then there is unwanted discharge of chemicals which is wasteful and costly. On the other hand, the free falling of chemicals from the distributor unit, when in its inoperative mode, to the dispersing means, when it is also in its inoperative mode, would result in the possible clogging and malfunction of the blower, which, when later operated, would cause a burst of accumulated chemicals onto the crop material, thereby resulting in an uneven, non-uniform, distribution of the chemicals in the bale.

It is thought that the invention amd many of its attendant advantages will be understood from the foregoing description and it will be apparent that various changes may be made in form, construction and arrangement of the improved chemical dispenser without departing from the spirit and scope of the invention or sacrificing all of its material advantages, the form hereinbefore described being merely a preferred or exemplary embodiment thereof.

Having thus described the invention, what is claimed is:

1. An improved dry particulate chemical dispenser for a round baler having a mobile frame adapted to move across a field of crop material, a bale forming chamber carried by said frame and adapted to wrap a continuous mat of crop material about itself in forming a large cylindrical bale, and pick-up means mounted on said frame for gathering crop material from the field and delivering a mat of crop material to said bale forming chamber, said chemical dispenser comprising:

(a) a hopper mounted on said frame for temporary storage of dry particulate chemicals therein, said hopper being rectangular-shaped and formed from contiguous walls including two transversely spaced sidewalls, a front wall, a rear wall, and with the lower portions of the front and rear walls sloping inwardly toward one another for mating with a hollow tube member which is transversely disposed between the lower end portions of said sidewalls in thereby forming the bottom of said hopper;

(b) a pair of transversely spaced inlet openings provided in the upper surface of said tube member and a pair of transversely spaced discharge openings provided in the lower surface of said tube member, respective ones of said upper inlet openings and said lower discharge openings being laterally offset from one another so as to prevent chemicals stored above said upper surface of said tube member from having a straight flow path from said inlet openings down through said discharge openings;

(c) a transverse auger supported for rotation within said hollow tube member, upon rotation of said auger, chemicals which enter into said tube member through said upper inlet openings are conveyed along a portion of said tube member and are discharged out through said lower discharge openings;

(d) a blower having a discharge spout disposed below said hopper and being operable to produce a positive airstream out through said discharge spout, said discharge spout being provided with a pair of receiving openings interconnected and in flow through communication with said discharge openings of said hopper whereby chemicals are dispensed directly from said discharge openings of said hopper into the positive airstream produced by said blower; and (e) direction means connected to the discharge spout of said blower for channeling the dry particulate chemicals dispersed within said positive airstream rearwardly toward said bale forming chamber for discharge of same in the form of a plume onto the crop material.

2. The improved chemical dispenser as defined in claim 1, wherein said direction means provides a substantially smooth uninterrupted flow path for said positive airstream having said dry particulate chemicals dispersed therein.

3. The improved chemical dispenser as defined in claim 2, wherein said direction means includes at least one rigid conducit.

4. The improved chemical dispenser as defined in claim 2, wherein said direction means includes a pair of rigid conduits disposed in a generally V-shape such that the distal end of said conduits adjacent said bale forming chamber are a greater transverse distance apart than the ends of said conduits that connect to said blower discharge spout.

5. The improved chemical dispenser as defined in claim 3, wherein said direction means further includes a deflector mounted on the distal end of said at least one conduit for directing the discharge airstream plume of dispersed chemicals onto selected areas of said crop material mat.

6. The improved chemical dispenser as defined in claim 1, further including a rotatable agitator extending between said sidewalls and being disposed a short distance above said upper surface of said transverse tube member, said agitator being operable such that rotation thereof forces the chemicals above said upper surface down through said inlet openings and to said auger to thereby assist in the conveying of the chemicals out through said discharge openings.

7. The chemical dispenser as defined in claim 1, further including:
- a first electric motor operably connected to said auger for rotating said auger upon operation of said first electric motor;
- a second electric motor operably connected to said blower for driving said blower to thereby produce a positive airstream upon operation of said second electric motor; and
- switch means operably interconnected to said first and second electric motors for selectively controlling the same in response to the delivery and nondelivery of said crop material to said bale forming chamber such that dry particulate chemicals are discharged thereunto only when a mat of crop material is being delivered to said bale forming chamber, whereby chemical usage is conserved.

8. The improved chemical dispenser as defined in claim 7, wherein said switch means includes a sensor element positioned adjacent said pick-up means for sensing the presence and non-presence of crop material on said pick-up means.

9. The improved chemical dispenser as defined in claim 8, wherein said sensor element extends into the flow path of crop material about said pick-up means and is deflected to a first operative position by the flow of crop material over said pick-up means corresponding to the delivery of crop material to said bale forming chamber and the resulting discharging of chemicals onto said wedge-shaped area, said sensor element being deflected to a second inoperative position corresponding to the non-delivery of crop material to said bale forming chamber and the resulting non-discharging of chemicals onto said wedge-shaped area.

* * * * *